US012611862B2

(12) United States Patent
Takabe et al.

(10) Patent No.: US 12,611,862 B2
(45) Date of Patent: Apr. 28, 2026

(54) LIQUID EJECTING HEAD AND LIQUID EJECTING APPARATUS

(71) Applicant: SEIKO EPSON CORPORATION, Tokyo (JP)

(72) Inventors: Motoki Takabe, Shiojiri (JP); Yu Shiozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 223 days.

(21) Appl. No.: 18/363,956

(22) Filed: Aug. 2, 2023

(65) Prior Publication Data

US 2024/0042759 A1 Feb. 8, 2024

(30) Foreign Application Priority Data

Aug. 4, 2022 (JP) ................................ 2022-124598

(51) Int. Cl.
*B41J 2/14* (2006.01)

(52) U.S. Cl.
CPC .. *B41J 2/14233* (2013.01); *B41J 2002/14306* (2013.01); *B41J 2002/14419* (2013.01); *B41J 2002/14491* (2013.01)

(58) Field of Classification Search
CPC .......... B41J 2/14233; B41J 2002/14306; B41J 2002/14419
See application file for complete search history.

(56) References Cited

U.S. PATENT DOCUMENTS

2020/0238701 A1* 7/2020 Takabe ................. B41J 2/14201

FOREIGN PATENT DOCUMENTS

JP 2021-130258 A 9/2021

* cited by examiner

*Primary Examiner* — Geoffrey S Mruk
(74) *Attorney, Agent, or Firm* — WORKMAN NYDEGGER

(57) ABSTRACT

A liquid ejecting head wherein a first common flow passage that is in shared communication with the plurality of individual flow passages and supplies a liquid to the plurality of individual flow passages, a second common flow passage that is in shared communication with the plurality of individual flow passages and collects a liquid from the plurality of individual flow passages, and a first bypass flow passage that connects the first common flow passage and the second common flow passage are formed in the first substrate, and the first substrate is comprised of a pressure compartment substrate in which the plurality of pressure compartments is formed and a communication plate that is provided between the pressure compartment substrate and the second substrate.

15 Claims, 9 Drawing Sheets

LIQUID EJECTING HEAD AND LIQUID EJECTING APPARATUS

The present application is based on, and claims priority from JP Application Serial Number 2022-124598, Aug. 4, 2022, the disclosure of which is hereby incorporated by reference herein in its entirety.

BACKGROUND

1. Technical Field

Embodiments of the present disclosure relate to a liquid ejecting head and a liquid ejecting apparatus.

2. Related Art

Liquid ejecting heads provided in a liquid ejecting apparatus such as an ink-jet printer and configured to eject a liquid such as ink are widespread. For example, JP-A-2021-130258 disclose a technique regarding the following liquid ejecting head. The liquid ejecting head includes a plurality of individual flow passages provided correspondingly to a plurality of nozzles from which a liquid is ejected, a single common supply flow passage that is in shared communication with the plurality of individual flow passages and supplies a liquid to the plurality of individual flow passages, a single common discharge flow passage that is in shared communication with the plurality of individual flow passages and collects a liquid from the plurality of individual flow passages. In the liquid ejecting head, liquid circulation from the common supply flow passage to the common discharge flow passage is performed via the individual flow passages.

However, in related art, when there exist many nozzles from which ink is not ejected among the plurality of nozzles of the liquid ejecting head, it could happen that the pressure that is required for circulating the liquid from the common supply flow passage to the common discharge flow passage varies significantly, as compared with when there exist many nozzles from which ink is ejected.

SUMMARY

A liquid ejecting head according to an aspect of the present disclosure includes: a first substrate in which a plurality of individual flow passages corresponding to a plurality of pressure compartments configured to apply pressure to a liquid is formed in such a way as to be arranged in a first direction; and a second substrate in which a plurality of nozzles corresponding to the plurality of individual flow passages and configured to eject a liquid is formed, wherein a first common flow passage that is in shared communication with the plurality of individual flow passages and supplies a liquid to the plurality of individual flow passages, a second common flow passage that is in shared communication with the plurality of individual flow passages and collects a liquid from the plurality of individual flow passages, and a first bypass flow passage that connects the first common flow passage and the second common flow passage are formed in the first substrate, and the first substrate is comprised of a pressure compartment substrate in which the plurality of pressure compartments is formed and a communication plate that is provided between the pressure compartment substrate and the second substrate.

A liquid ejecting apparatus according to an aspect of the present disclosure includes: the liquid ejecting head stated above, and a controller that controls liquid ejection from the liquid ejecting head stated above.

DESCRIPTION OF EXEMPLARY EMBODIMENTS

Figure 1:
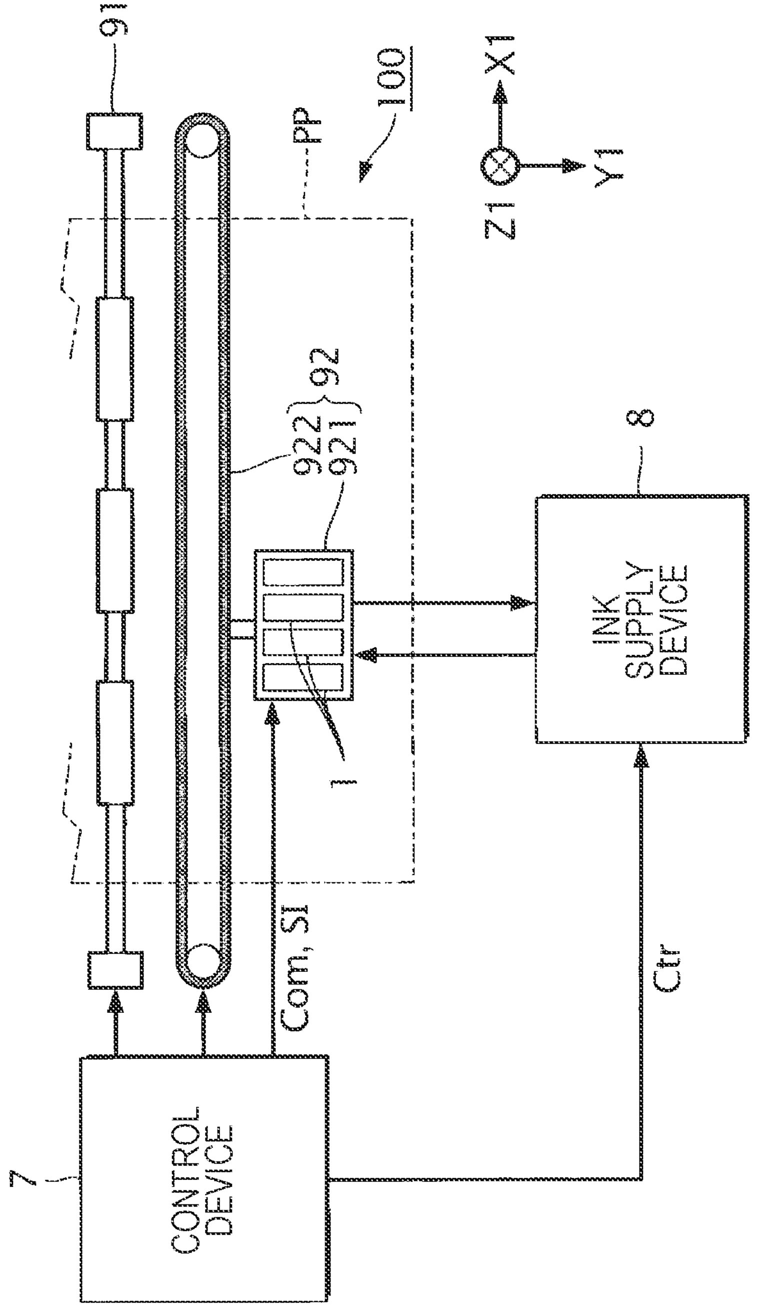
FIG. 1 is a configuration diagram illustrating an example of a liquid ejecting apparatus according to an embodiment of the present disclosure.

With reference to the accompanying drawings, a certain embodiment of the present disclosure will now be explained. In the drawings, however, the dimensions and scales of components may be made different as appropriate from those in actual implementation. Since the embodiment described below shows some preferred examples of the present disclosure, they contain various technically-preferred limitations. However, the scope of the present disclosure shall not be construed to be limited to the examples described below unless and except where the description contains an explicit mention of an intent to limit the present disclosure.

A. Embodiment

A liquid ejecting apparatus 100 according to a present embodiment will now be described.

1. Overview of Liquid Ejecting Apparatus

FIG. 1 is a diagram for explaining the liquid ejecting apparatus 100 according to the present embodiment.

The liquid ejecting apparatus 100 is an ink-jet printing apparatus that ejects ink onto a medium PP. A typical example of the medium PP is printing paper, but not limited thereto. Any target of printing such as a resin film or a cloth can be used as the medium PP. Ink is an example of a "liquid".

As illustrated in FIG. 1, the liquid ejecting apparatus 100 includes a plurality of liquid ejecting heads 1, a control device 7, an ink supply device 8, a moving mechanism 91, and a carriage mechanism 92.

The control device 7 includes, for example, a processing circuit such as a CPU or an FPGA, and a storage circuit such as a semiconductor memory, and controls various elements of the liquid ejecting apparatus 100. CPU is an acronym for Central Processing Unit. FPGA is an acronym for Field Programmable Gate Array.

Under the control of the control device 7, the moving mechanism 91 transports the medium PP in a Y1 direction along a Y axis. In the description below, the Y1 direction along the Y axis, and a Y2 direction, which is the opposite of the Y1 direction, will be collectively referred to as "Y-axis direction". In addition, in the description below, an X1 direction along an X axis, which intersects with the Y axis, and an X2 direction, which is the opposite of the X1 direction, will be collectively referred to as "X-axis direction". In addition, in the description below, a Z1 direction along a Z axis, which intersects with the X axis and the Y axis, and a Z2 direction, which is the opposite of the Z1 direction, will be collectively referred to as "Z-axis direction". Moreover, when a scalar product of a vector having a starting point at one object and an ending point at another object and a vector directed in the X1 direction is "positive", it will be described below that this another object exists on an "X1 side" with respect to this one object. Moreover, when a scalar product of a vector having a starting point at one object and an ending point at another object and a vector directed in the X2 direction is "positive", it will be described below that this another object exists on an "X2 side" with respect to this one object. The same definition applies to a "Y1 side", a "Y2 side", a "Z1 side", and a "Z2 side".

In the present embodiment, as an example, a case where the X, Y, and Z axes are orthogonal to one another is assumed. However, the scope of the present disclosure is not limited to this exemplary configuration. It is sufficient as long as the X, Y, and Z axes intersect with one another.

Under the control of the control device 7, the carriage mechanism 92 reciprocates the plurality of liquid ejecting heads 1 in the X1 direction and the X2 direction. The carriage mechanism 92 includes a housing case 921, in which the plurality of liquid ejecting heads 1 is housed, and an endless belt 922, to which the housing case 921 is fixed. Liquid containers 93 may be housed together with the liquid ejecting heads 1 in the housing case 921.

The control device 7 supplies, to the liquid ejecting head 1, a drive signal Com for driving the liquid ejecting head 1 and a control signal SI for controlling the liquid ejecting head 1. Driven by the drive signal Com under the control by the control signal SI, the liquid ejecting head 1 ejects ink in the Z1 direction from some or all of a plurality of nozzles N provided in the liquid ejecting head 1. That is, the liquid ejecting head 1 ejects ink droplets from some or all of the plurality of nozzles N while transporting the medium PP by the moving mechanism 91 and while reciprocating the liquid ejecting head 1 by the carriage mechanism 92 to cause the ejected ink droplets to land onto the surface of the medium PP, thereby forming a print-demanded image on the surface of the medium PP. The nozzles N will be described later with reference to FIGS. 2 and 3.

The ink supply device 8 temporarily stores ink. In addition, based on a control signal Ctr supplied from the control device 7, the ink supply device 8 supplies ink that is temporarily stored in the ink supply device 8 to the liquid ejecting head 1. Moreover, based on a control signal Ctr supplied from the control device 7, the ink supply device 8 collects ink from the liquid ejecting head 1 and returns the collected ink to the liquid ejecting head 1.

In the present embodiment, as an example, it is assumed that the ink supply device 8 temporarily stores four types of ink corresponding to cyan, magenta, yellow, and black. In addition, in the present embodiment, it is assumed that the liquid ejecting head 1 includes four liquid ejecting heads 1 corresponding to four types of ink. However, for a simpler explanation, one type of ink will be described below in a focused manner among the four types of ink that are temporarily stored in the ink supply device 8. Moreover, for a simpler explanation, one liquid ejecting head 1 corresponding to one type of ink will be described below in a focused manner among four liquid ejecting heads 1 included in the liquid ejecting head 1.

2. Overview of Liquid Ejecting Head

With reference to FIGS. 2 to 6, an overview of the liquid ejecting head 1 is given below.

Figure 2:
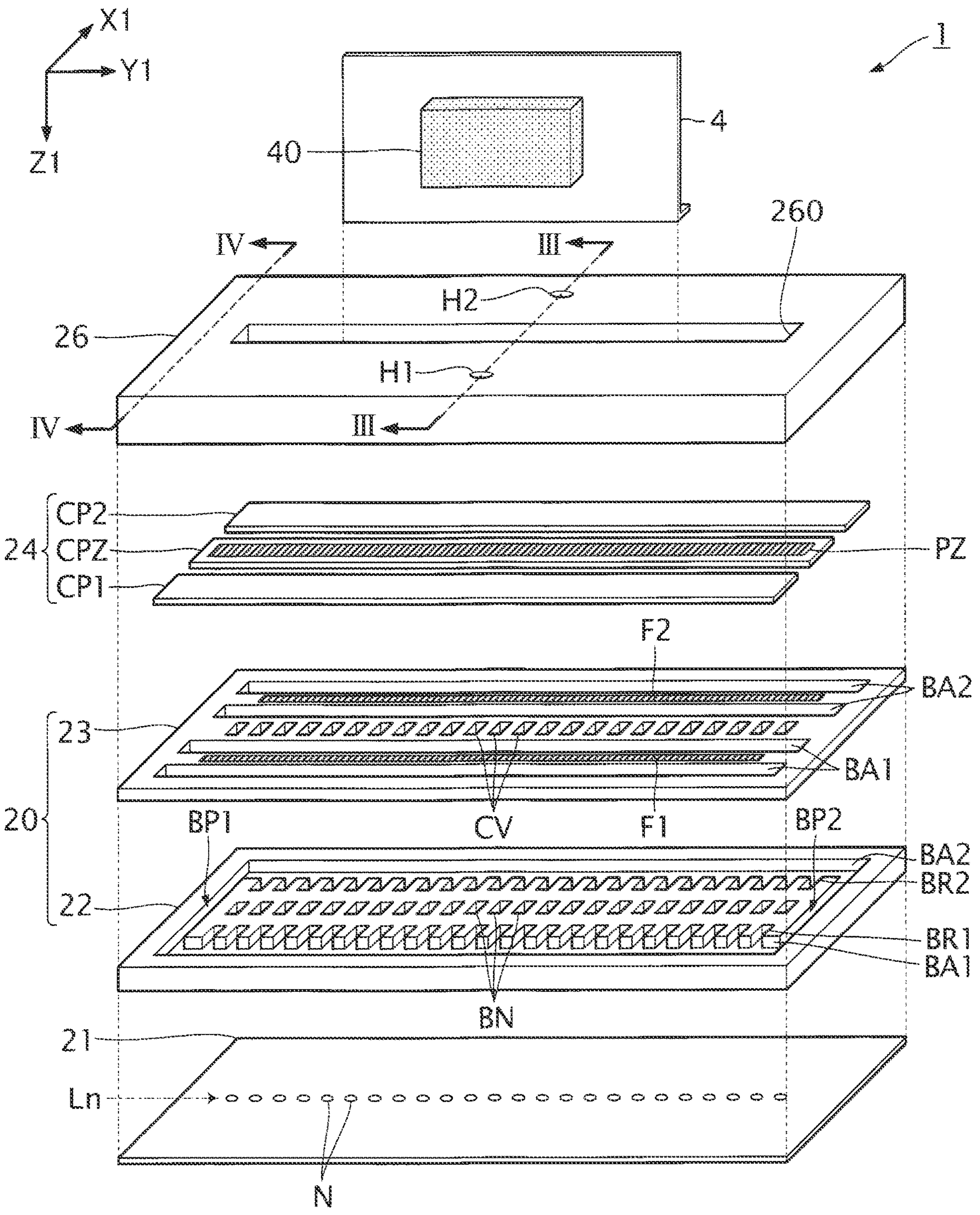
FIG. 2 is an exploded perspective view illustrating an example of the configuration of a liquid ejecting head.
Figure 3:
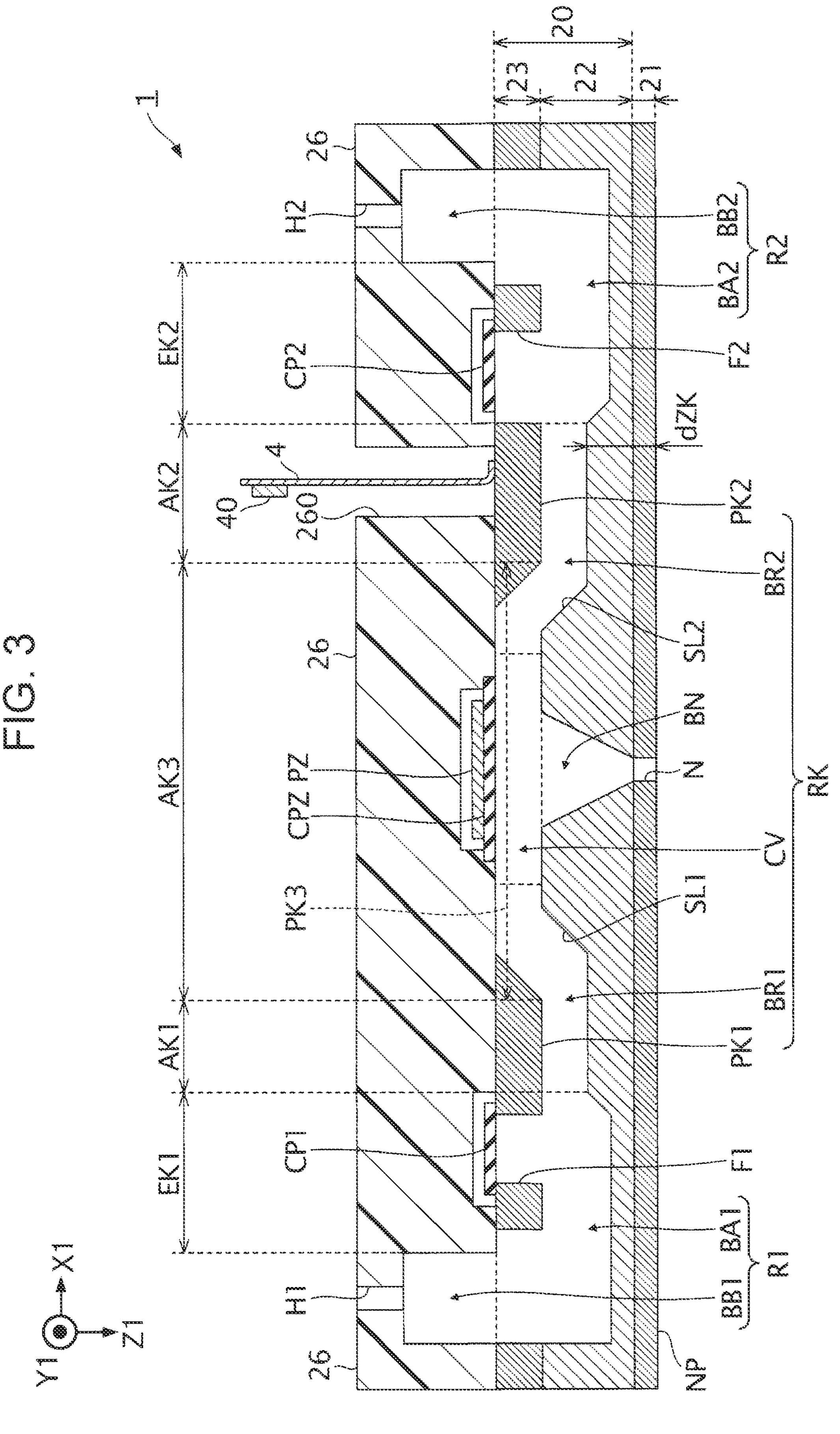
FIG. 3 is a cross-sectional view illustrating an example of the configuration of the liquid ejecting head.
Figure 4:
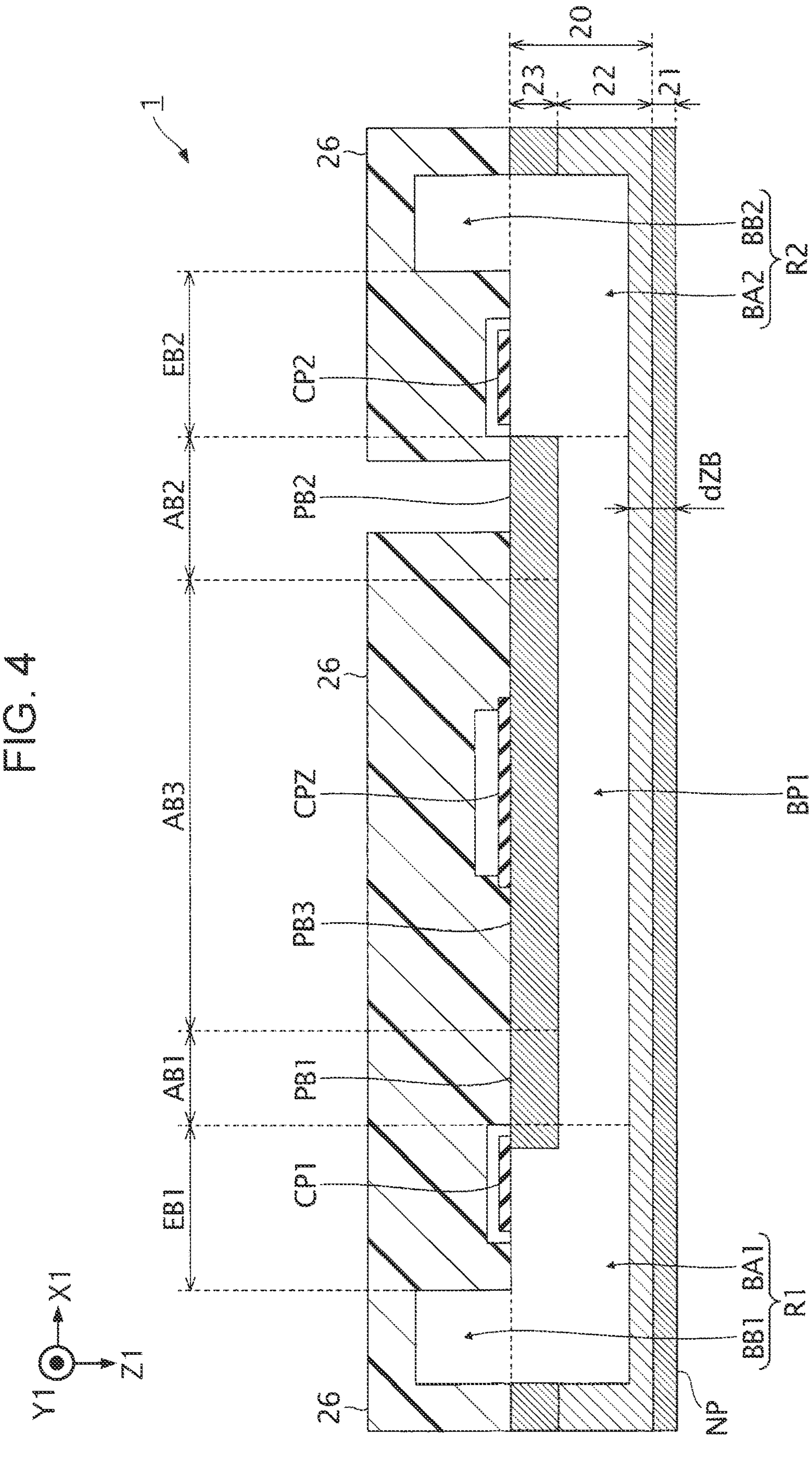
FIG. 4 is a cross-sectional view illustrating an example of the configuration of the liquid ejecting head.

FIG. 2 is an exploded perspective view of the liquid ejecting head 1. FIG. 3 is a cross-sectional view taken along the line III-III of FIG. 2. FIG. 4 is a cross-sectional view taken along the line IV-IV of FIG. 2.

As illustrated in FIGS. 2 to 4, the liquid ejecting head 1 includes a nozzle substrate 21, a head substrate 20 that is comprised of a communication plate 22 and a pressure compartment substrate 23, a diaphragm 24, a flow passage forming substrate 26, and a wiring substrate 4.

In the present embodiment, the head substrate 20 is an example of a "first substrate", the nozzle substrate 21 is an example of a "second substrate", and the flow passage forming substrate 26 is an example of a "third substrate".

As illustrated in FIG. 2, the nozzle substrate 21 is a plate-like member that has longer sides in the Y-axis direction and extends substantially in parallel with an X-Y plane. The concept of "substantially in parallel with" mentioned here includes not only a case of being perfectly in parallel but also a case of being able to be deemed as parallel, with a margin of error taken into consideration. In the present embodiment, the concept of "substantially in parallel with" includes a case of being able to be deemed as parallel, with a margin of error of 10% or so taken into consideration. The nozzle substrate 21 is manufactured by, for example, processing a monocrystalline silicon substrate by using a semiconductor manufacturing technology such as etching. Any known material and method may be used instead for manufacturing the nozzle substrate 21.

The nozzle substrate 21 has M-number of nozzles N. The nozzle N mentioned here is a through hole provided in the nozzle substrate 21. The value M is a natural number that satisfies "$M \geq 2$". In the present embodiment, it is assumed that the nozzles N, the number of which is M, are arranged linearly in the Y-axis direction in the nozzle substrate 21. In the description below, the M-number of nozzles N arranged linearly in the Y-axis direction is sometimes referred to as "nozzle row Ln".

As illustrated in FIGS. 2 to 4, the communication plate 22 is provided at a Z2-side position with respect to the nozzle substrate 21. The communication plate 22 is a plate-like member that has longer sides in the Y-axis direction and extends substantially in parallel with an X-Y plane. The communication plate 22 is manufactured by, for example, processing a monocrystalline silicon substrate by using a semiconductor manufacturing technology. Any known material and method may be used instead for manufacturing the communication plate 22.

As illustrated in FIGS. 2 to 4, the pressure compartment substrate 23 is provided at a Z2-side position with respect to the communication plate 22. The pressure compartment substrate 23 is a plate-like member that has longer sides in the Y-axis direction and extends substantially in parallel with an X-Y plane. The pressure compartment substrate 23 is manufactured by, for example, processing a monocrystalline silicon substrate by using a semiconductor manufacturing technology. Any known material and method may be used instead for manufacturing the pressure compartment substrate 23.

Passages through which ink flows are formed in the communication plate 22 and the pressure compartment substrate 23. Specifically, one common flow passage BA1, which is provided in such a way as to extend in the Y-axis direction, and one common flow passage BA2, which is provided at an X1-side position with respect to the common flow passage BA1 in such a way as to extend in the Y-axis direction, are formed in the communication plate 22 and the pressure compartment substrate 23. In the present embodiment, the common flow passage BA1 is an example of a "first common flow passage", and the common flow passage BA2 is an example of a "second common flow passage".

In the communication plate 22 and the pressure compartment substrate 23, M-number of connection flow passages BR1 corresponding to the M-number of nozzles N are formed. In the communication plate 22 and the pressure compartment substrate 23, M-number of connection flow passages BR2 corresponding to the M-number of nozzles N are formed. In the communication plate 22, M-number of nozzle flow passages BN corresponding to the M-number of nozzles N are formed. In the pressure compartment substrate 23, M-number of pressure compartments CV corresponding to the M-number of nozzles N are formed.

Among them, the connection flow passages BR1 are in communication with the common flow passage BA1 and are provided at X1-side positions with respect to the common flow passage BA1 in such a way as to extend in the X-axis direction. The connection flow passages BR2 are in communication with the common flow passage BA2 and are provided at X2-side positions with respect to the common flow passage BA2 in such a way as to extend in the X-axis direction. Each pressure compartment CV communicates the connection flow passage BR1 and the connection flow passage BR2 to each other at a position between the connection flow passage BR1 and the connection flow passage BR2, and is in communication with the nozzle flow passage BN. Each nozzle flow passage BN is provided at a Z1-side position with respect to the pressure compartment CV, is in communication with the pressure compartment CV, and is in communication with the nozzle N.

In the description below, the common flow passage BA1 and the common flow passage BA2 will be sometimes collectively referred to as "common flow passage BA", and the connection flow passage(s) BR1 and the connection flow passage(s) BR2 will be sometimes collectively referred to as "connection flow passage(s) BR".

In addition, in the description below, the connection flow passage(s) BR1, the pressure compartment(s) CV that is in communication with the connection flow passage(s) BR1, and the connection flow passage(s) BR2 that is in communication with the pressure compartment(s) CV will be sometimes referred to as "individual flow passage(s) RK". Moreover, in the description below, the individual flow passage RK corresponding to an m-th nozzle N among the M-number of nozzles N will be sometimes referred to as an "individual flow passage RK[m]". In this definition, the variable number m is a natural number that satisfies "1≤m≤M". In the present embodiment, M-number of individual flow passages RK[1] to RK[M] corresponding to the M-number of nozzles N are arranged in the Y-axis direction. In the present embodiment, the Y1 direction, in which the M-number of individual flow passages RK[1] to RK[M] are arranged, is an example of a "first direction".

In the present embodiment, each individual flow passage RK extends in the X-axis direction. In the present embodiment, the X1 direction, in which each individual flow passage RK extends, is an example of a "second direction".

Moreover, in the present embodiment, wall surfaces of the individual flow passage RK include, besides wall surfaces extending in the X-axis direction, wall surfaces extending in directions different from the X-axis direction, such as a sloped surface SL1 and a sloped surface SL2. The wall surfaces extending in the X-axis direction mean wall surfaces having a normal vector orthogonal to the X-axis direction. The wall surfaces extending in directions different from the X-axis direction mean wall surfaces having normal vectors orthogonal to directions different from the X-axis direction. In the present embodiment, a wall surface(s) extending in a direction(s) different from the X-axis direction is an example of "a portion extending in a direction other than the second direction".

As illustrated in FIGS. 2 to 4, the diaphragm 24 is provided at a Z2-side position with respect to the pressure compartment substrate 23. The diaphragm 24 includes a vibration plate CPZ, a vibration absorption plate CP1, and a vibration absorption plate CP2. Each of the vibration plate CPZ, the vibration absorption plate CP1, and the vibration absorption plate CP2 is a plate-like member that has longer sides in the Y-axis direction and extends substantially in parallel with an X-Y plane, and is capable of vibrating elastically. Each of the vibration plate CPZ, the vibration absorption plate CP1, and the vibration absorption plate CP2 includes, for example, an elastic film made of silicon oxide and an insulation film made of zirconium oxide.

The vibration plate CPZ is provided at a Z2-side position with respect to the pressure compartment CV. At Z2-side positions with respect to the vibration plate CPZ, M-number of piezoelectric elements PZ corresponding to the M-number of pressure compartments CV are provided. The piezoelectric element PZ is a passive element that deforms in response to a change in potential of the drive signal Com. Specifically, the piezoelectric element PZ is driven to deform in response to a change in potential of the drive signal Com. The vibration plate CPZ vibrates by being driven by the deformation of the piezoelectric element PZ. The vibration of the vibration plate CPZ causes changes in pressure inside the pressure compartment CV. Then, due to the changes in pressure inside the pressure compartment CV, ink with which the inside of the pressure compartment CV is filled flows through the nozzle flow passage BN and is then ejected from the nozzle N in the Z1 direction. In the present embodiment, the Z1 direction, in which ink is ejected from the nozzle N, is an example of a "third direction".

The vibration absorption plate CP1 is provided at a Z2-side position with respect to the common flow passage BA1. When ink flowing inside the common flow passage BA1 vibrates in accordance with changes in pressure inside the pressure compartment CV, the vibration absorption plate CP1 absorbs the vibrations. The vibration absorption plate CP2 is provided at a Z2-side position with respect to the common flow passage BA2. When ink flowing inside the common flow passage BA2 vibrates in accordance with changes in pressure inside the pressure compartment CV, the vibration absorption plate CP2 absorbs the vibrations. In the description below, the vibration absorption plate CP1 and the vibration absorption plate CP2 will be sometimes collectively referred to as "vibration absorption plate CP". In the present embodiment, the vibration absorption plate CP1 is an example of a "first vibration absorber", and the vibration absorption plate CP2 is an example of a "second vibration absorber".

As illustrated in FIGS. 2 to 4, the flow passage forming substrate 26 is provided at a Z2-side position with respect to the pressure compartment substrate 23. The flow passage forming substrate 26 is a plate-like member that has longer sides in the Y-axis direction and extends substantially in parallel with an X-Y plane. The flow passage forming substrate 26 is formed by, for example, injection molding of a resin material. Any known material and method may be used instead for manufacturing the flow passage forming substrate 26.

Passages through which ink flows are formed in the flow passage forming substrate 26. Specifically, one common flow passage BB1, which is provided in such a way as to extend in the Y-axis direction, and one common flow passage BB2, which is provided in such a way as to extend in the Y-axis direction, are formed in the flow passage forming substrate 26. The common flow passage BB1 is in communication with the common flow passage BA1 and is provided at a Z2-side position with respect to the common flow passage BA1. The common flow passage BB2 is in communication with the common flow passage BA2 and is provided at a Z2-side position with respect to the common flow passage BA2 and at an X1-side position with respect to the common flow passage BB1. In the description below, the common flow passage BB1 and the common flow passage BB2 will be sometimes collectively referred to as "common flow passage BB".

In the description below, the common flow passage BA1 and the common flow passage BB1, which is in communication with the common flow passage BA1, will be sometimes collectively referred to as "common flow passage R1". In addition, in the description below, the common flow passage BA2 and the common flow passage BB2, which is in communication with the common flow passage BA2, will be sometimes collectively referred to as "common flow passage R2". Moreover, in the description below, the common flow passage R1 and the common flow passage R2 will be sometimes collectively referred to as "common flow passage R".

A connection opening H1, which is in communication with the common flow passage BB1, and a connection opening H2, which is in communication with the common flow passage BB2, are provided in the flow passage forming substrate 26. Ink is supplied from the ink supply device 8 to the common flow passage R1, which includes the common flow passage BB1, through the connection opening H1. A part of the ink having been supplied to the common flow passage R1 flows through the connection flow passage BR1 to fill the pressure compartment CV with itself. Then, when the piezoelectric element PZ is driven by the drive signal Com, a part of the ink with which the pressure compartment CV is filled flows through the nozzle flow passage BN to be ejected from the nozzle N. Another part of the ink with which the pressure compartment CV is filled flows through the connection flow passage BR2 to the common flow passage R2. A part of the ink temporarily stored in the common flow passage R2, which includes the common flow passage BB2, is collected to the ink supply device 8 through the connection opening H2.

A through hole 260 is provided in the flow passage forming substrate 26. The through hole 260 is a through-hole cavity that is located between the common flow passage BB1 and the common flow passage BB2 when the flow passage forming substrate 26 is viewed in the Z1 direction and goes from the Z1-side surface of the flow passage forming substrate 26 to the Z2-side surface of the flow passage forming substrate 26. The wiring substrate 4 is inserted in the through hole 260.

The pressure compartment substrate 23 has two surfaces whose normal-line direction is the Z-axis direction, and, as illustrated in FIGS. 2 and 3, the wiring substrate 4 is mounted on the Z2-side one of these two surfaces. The wiring substrate 4 is a component for electrically coupling the liquid ejecting head 1 to the control device 7. For example, a flexible wiring board such as FPC or FFC can be preferably used as the wiring substrate 4. FPC is an acronym for Flexible Printed Circuit. FFC is an acronym for Flexible Flat Cable. An integrated circuit 40 is mounted on the wiring substrate 4. The integrated circuit 40 is an electric circuit that performs switching as to whether or not to supply the drive signal Com to the piezoelectric element PZ under the control by the control signal SI.

As illustrated in FIGS. 2 and 3, a filter F1 and a filter F2 are formed in the pressure compartment substrate 23 The filter F1 is a structural object for catching an air bubble present in ink inside the common flow passage BA1. The filter F2 is a structural object for catching an air bubble present in ink inside the common flow passage BA2. In the description below, the filter F1 and the filter F2 will be sometimes collectively referred to as "filter F".

Figure 5:
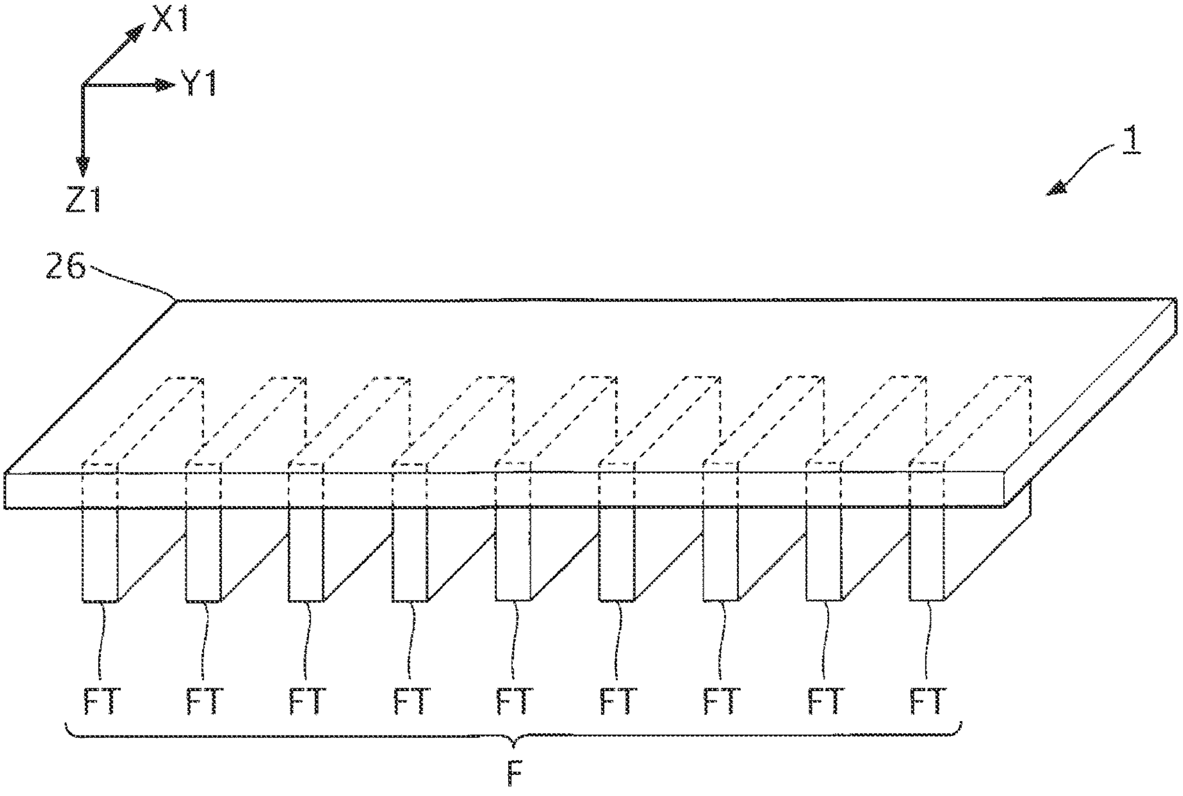
FIG. 5 is a perspective view illustrating an example of the configuration of a flow passage forming substrate and a filter.

FIG. 5 is a perspective view of the filter F and the flow passage forming substrate 26.

As illustrated in FIG. 5, the filter F is comprised of a plurality of protruding portions FT arranged in the Y-axis direction. The filter F catches an air bubble that goes up in the Z2 direction due to buoyancy in ink that flows inside the common flow passage BA by means of two protruding portions FT located next to each other in the Y-axis direction, among the plurality of protruding portions FT. In the present embodiment, as an example, it is assumed that the plurality of protruding portions FT is formed of the pressure compartment substrate 23. In addition, in the present embodiment, as an example, it is assumed that the plurality of protruding portions FT is mounted on the Z1-side one of two surfaces of the flow passage forming substrate 26 whose normal-line direction is the Z-axis direction.

As illustrated in FIGS. 2 and 4, one bypass flow passage BP1, which is provided in such a way as to extend in the X-axis direction for connecting the common flow passage BA1 and the common flow passage BA2 to each other, and one bypass flow passage BP2, which is provided in such a way as to extend in the X-axis direction for connecting the common flow passage BA1 and the common flow passage BA2 to each other at a Y1-side position with respect to the bypass flow passage BP1, are formed in the communication plate 22. In the description below, the bypass flow passage BP1 and the bypass flow passage BP2 will be sometimes collectively referred to as "bypass flow passage BP". In the present embodiment, a case where the bypass flow passage BP is formed in the communication plate 22 will be taken as an example. However, the scope of the present disclosure is not limited to this exemplary configuration. The bypass flow passage BP may be formed in the communication plate 22 and the pressure compartment substrate 23. In the present embodiment, the bypass flow passage BP1 is an example of a "first bypass flow passage", and the bypass flow passage BP2 is an example of a "second bypass flow passage".

In the description below, a portion of the pressure compartment substrate 23, where the individual flow passage(s) RK is provided will be referred to as "individual-flow-passage corresponding portion PK". In addition, in the description below, a portion of the pressure compartment substrate 23, where the bypass flow passage(s) BP is provided will be referred to as "bypass-flow-passage corresponding portion PB". In the present embodiment, the individual-flow-passage corresponding portion PK is an example of a "first flow passage portion", and the bypass-flow-passage corresponding portion PB is an example of a "second flow passage portion".

Moreover, in the description below, an area that is located between the common flow passage BA1 and the pressure compartments CV in the X-axis direction will be referred to as "area A1", an area that is located between the common flow passage BA2 and the pressure compartments CV in the X-axis direction will be referred to as "area A2", and an area that is located between the area A1 and the area A2 and includes the pressure compartments CV will be referred to as "area A3". In the present embodiment, the area A1 is an example of a "first area", the area A2 is an example of a "second area", and the area A3 is an example of a "third area".

Furthermore, in the description below, an area that is a part of the area A1 and whose range in the Y-axis direction corresponds to the individual-flow-passage corresponding portion PK will be referred to as "area AK1", an area that is a part of the area A2 and whose range in the Y-axis direction corresponds to the individual-flow-passage corresponding portion PK will be referred to as "area AK2", and an area that is a part of the area A3 and whose range in the Y-axis direction corresponds to the individual-flow-passage corresponding portion PK will be referred to as "area AK3". Furthermore, in the description below, an area that is a part of the area A1 and whose range in the Y-axis direction corresponds to the bypass-flow-passage corresponding portion PB will be referred to as "area AB1", an area that is a part of the area A2 and whose range in the Y-axis direction corresponds to the bypass-flow-passage corresponding portion PB will be referred to as "area AB2", and an area that is a part of the area A3 and whose range in the Y-axis direction corresponds to the bypass-flow-passage corresponding portion PB will be referred to as "area AB3". That is, the area A1 is an area that includes the area AK1 and the area AB1, the area A2 is an area that includes the area AK2 and the area AB2, and the area A3 is an area that includes the area AK3 and the area AB3.

Furthermore, in the description below, an area that is located between the area AK1 and the common flow passage BB1 will be referred to as "area EK1", an area that is located between the area AK2 and the common flow passage BB2 will be referred to as "area EK2", an area that is located between the area AB1 and the common flow passage BB1 will be referred to as "area EB1", and an area that is located between the area AB2 and the common flow passage BB2 will be referred to as "area EB2". In the present embodiment, the area EK1 is an example of a first connection portion, and the area EB1 is an example of a second connection portion.

As illustrated in FIG. 3, in the present embodiment, the individual-flow-passage corresponding portion PK of the pressure compartment substrate 23 includes an individual portion PK1, which has a predetermined thickness Zth or greater in the area AK1, an individual portion PK2, which has the predetermined thickness Zth or greater in the area AK2, and an individual portion PK3, which has a through hole corresponding to the pressure compartment CV in the area AK3. In the present embodiment, the Z2-side wall surface of the individual flow passage RK is formed of the individual-flow-passage corresponding portion PK. Moreover, in the present embodiment, the Z1-side wall surface of the individual flow passage RK includes the sloped surface SL1 and the sloped surface SL2. As described above, in the present embodiment, the individual flow passage RK includes a wall surface(s) extending in a direction(s) different from the X-axis direction. In the present embodiment, the individual portion PK1 is an example of a "first portion", the individual portion PK2 is an example of a "second portion", and the individual portion PK3 is an example of a "third portion".

As illustrated in FIG. 3, in the present embodiment, the vibration absorption plate CP1 is provided in the area EK1, the vibration absorption plate CP2 is provided in the area EK2, and the vibration plate CPZ is provided in the area AK3. In the present embodiment, in an area in the Y-axis direction corresponding to the individual-flow-passage corresponding portion PK, the vibration absorption plate CP1 and the vibration absorption plate CP2 are provided at a distance from each other. In the present embodiment, the vibration absorption plate CP1 in an area in the Y-axis direction corresponding to the individual-flow-passage corresponding portion PK is an example of a "third vibration absorber".

As illustrated in FIG. 4, in the present embodiment, the bypass-flow-passage corresponding portion PB of the pressure compartment substrate 23 includes a bypass portion PB1, which has a predetermined thickness Zth or greater in the area AB1, a bypass portion PB2, which has the predetermined thickness Zth or greater in the area AB2, and a bypass portion PB3, which has the predetermined thickness Zth or greater in the area AB3. In the present embodiment, the Z2-side wall surface of the bypass flow passage BP is formed of the bypass-flow-passage corresponding portion PB. Moreover, in the present embodiment, the Z1-side wall surface of the bypass flow passage BP has a flat shape. As described here, in the present embodiment, the bypass flow passage BP is smaller in terms of area size of a wall surface extending in a direction different from the X-axis direction than the individual flow passage RK. In the example illustrated in FIG. 4, the bypass flow passage BP does not have any wall surface extending in a direction different from the X-axis direction; however, the scope of the present disclosure is not limited to this exemplary configuration. It is sufficient as long as the bypass flow passage BP is smaller in terms of area size of a wall surface(s) extending in a direction(s) different from the X-axis direction than the individual flow passage RK. In the present embodiment, the bypass portion PB1 is an example of a "fourth portion", the bypass portion PB2 is an example of a "fifth portion", and the bypass portion PB3 is an example of a "sixth portion".

As illustrated in FIG. 4, in the present embodiment, the vibration absorption plate CP1 is provided in the area EB1, the vibration absorption plate CP2 is provided in the area EB2, and the vibration plate CPZ is provided in the area AB3. In the present embodiment, in an area in the Y-axis direction corresponding to the bypass-flow-passage corresponding portion PB, the vibration absorption plate CP1 and the vibration absorption plate CP2 are provided at a distance from each other.

In the description below, as illustrated in FIG. 3, the minimum distance in the Z-axis direction between the Z1-side end of the individual flow passage RK and a nozzle plane NP will be referred to as "distance dZK". The nozzle plane NP mentioned here is the Z1-side surface of the nozzle substrate 21. In the present embodiment, as an example, it is assumed that the wall surface that defines the Z1-side end of the individual flow passage RK is formed of the communication plate 22. However, the wall surface that defines the Z1-side end of the individual flow passage RK may be formed of the nozzle substrate 21.

Moreover, in the description below, as illustrated in FIG. 4, the minimum distance in the Z-axis direction between the Z1-side end of the bypass flow passage BP and the nozzle plane NP, which is the Z1-side surface of the nozzle substrate 21, will be referred to as "distance dZB". In the present embodiment, as an example, it is assumed that the wall surface that defines the Z1-side end of the bypass flow passage BP is formed of the communication plate 22. However, the wall surface that defines the Z1-side end of the bypass flow passage BP may be formed of the nozzle substrate 21.

In the present embodiment, the individual flow passage RK and the bypass flow passage BP are provided in such a manner that the distance dZK and the distance dZB satisfy a relation of "dZK>dZB". In other words, in the present embodiment, the individual flow passage RK and the bypass flow passage BP are provided in such a manner that, for example, in a cross-sectional view taken in the Y-axis direction, the Z1-side end of the bypass flow passage BP is located between the Z1-side end of the individual flow passage RK and the nozzle plane NP, which is the Z1-side surface of the nozzle substrate 21.

Figure 6:
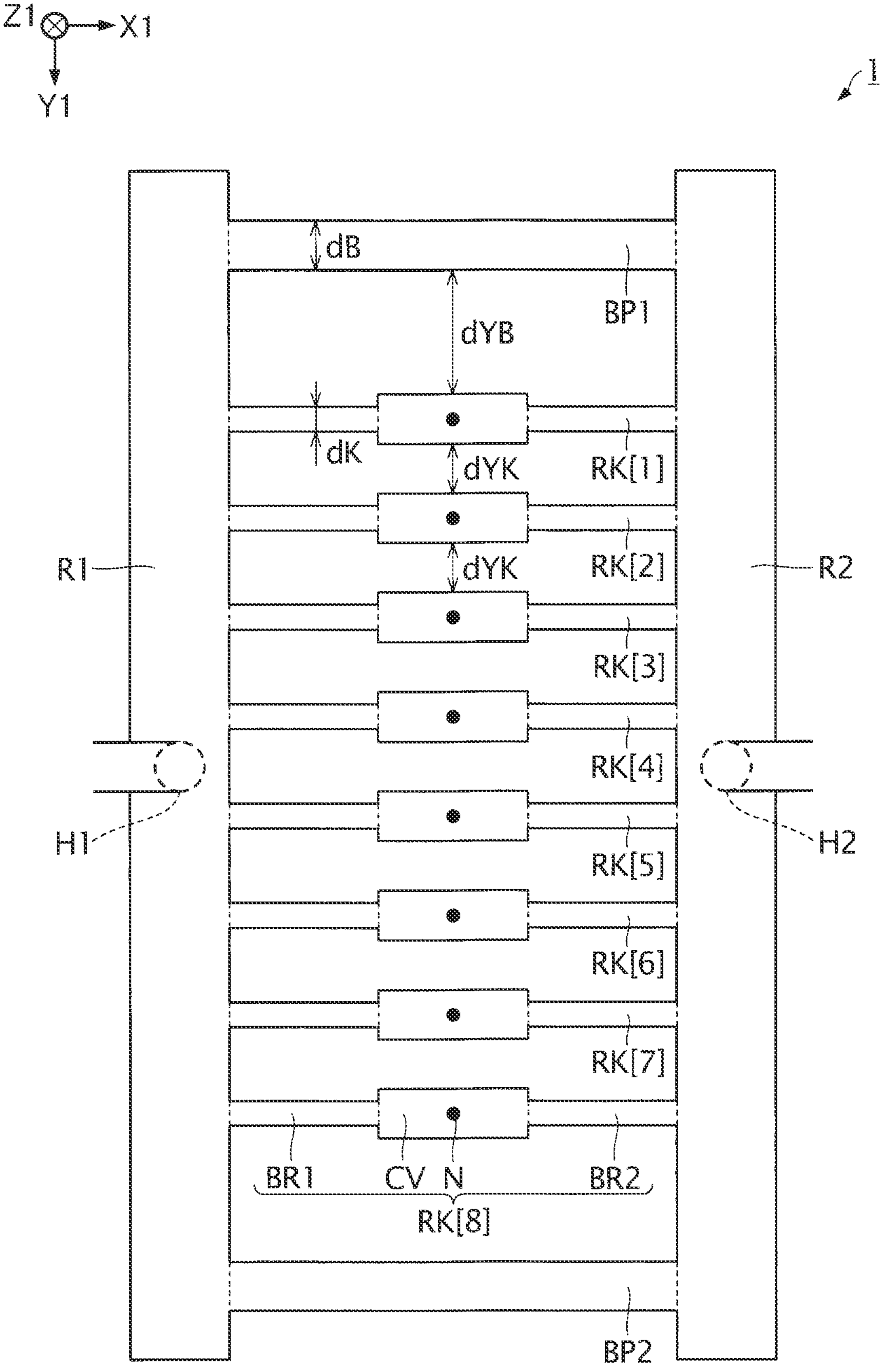
FIG. 6 is a plan view illustrating an example of the configuration of the liquid ejecting head.

FIG. 6 is a plan view illustrating a relation between the individual flow passage RK and the bypass flow passage BP when the liquid ejecting head 1 is viewed in plan in the Z1 direction. In FIG. 6, a case where the value M is 8 is illustrated as an example.

As illustrated in FIG. 6, in the present embodiment, the individual flow passage RK and the bypass flow passage BP are provided in such a manner that the width dB of the bypass flow passage BP in the Y-axis direction and the width dK of the individual flow passage RK in the Y-axis direction satisfy a relation of "dB>dK".

As described above, in the present embodiment, the Z2-side wall surface of the bypass flow passage BP is formed of the bypass portion PB1, the bypass portion PB2, and the bypass portion PB3, each of which has a predetermined thickness Zth. On the other hand, the Z2-side wall surface of the individual flow passage RK is formed of the individual portion PK1 and the individual portion PK2, each of which has a predetermined thickness Zth, and the individual portion PK3, which has a through hole. That is, in the present embodiment, the Z2-side wall surface of the bypass flow passage BP has a shape that is relatively flat in comparison with the individual flow passage RK.

Moreover, in the present embodiment, the bypass flow passage BP is formed in such a manner that its Z1-side wall surface has a flat shape, without any wall surface extending in a direction different from the X-axis direction. By contrast, the individual flow passage RK is formed in such a manner that its Z1-side wall surface includes a wall surface(s) extending in a direction(s) different from the X-axis direction, such as the sloped surface SL1 and the sloped surface SL2. That is, in the present embodiment, the Z1-side wall surface of the bypass flow passage BP has a shape that is relatively flat in comparison with the individual flow passage RK.

Moreover, the bypass flow passage BP and the individual flow passage RK are formed in such a manner that the distance dZB is less than the distance dZK. That is, in the present embodiment, the width of the bypass flow passage BP in the Z-axis direction is greater than that of the individual flow passage RK. Furthermore, in the present embodiment, the width dB of the bypass flow passage BP is greater than the width dK of the individual flow passage RK. That is, in the present embodiment, the width of the bypass flow passage BP in the Y-axis direction is greater than that of the individual flow passage RK. In other words, in the present embodiment, the cross-sectional area of the bypass flow passage BP is larger than that of the individual flow passage RK.

Because of the above features, the present embodiment makes it possible to make the flow-passage resistance of the bypass flow passage BP lower than that of the individual flow passage RK. Therefore, with the present embodiment, regardless of an amount of ink ejected from the M-number of nozzles N of the liquid ejecting head 1, it is possible to circulate ink from the common flow passage R1 to the common flow passage R2 via the bypass flow passage BP smoothly.

In the present embodiment, as illustrated in FIG. 3, the filter F1 is provided in, of the common flow passage BA1, the area EK1 corresponding to the individual flow passages RK, and the filter F2 is provided in, of the common flow passage BA2, the area EK2 corresponding to the individual flow passages RK. Moreover, in the present embodiment, as illustrated in FIG. 4, the filter F is not provided in, of the common flow passage BA1, the area EB1 corresponding to the bypass flow passage BP, and the filter F is not provided in, of the common flow passage BA2, the area EB2 corresponding to the bypass flow passage BP. For this reason, with the present embodiment, it is possible to make the flow-passage resistance against ink flowing from the common flow passage R1 to the common flow passage R2 via the bypass flow passage BP lower than the flow-passage resistance against ink flowing from the common flow passage R1 to the common flow passage R2 via the individual flow passage RK. Therefore, with the present embodiment, as compared with the flow of ink from the common flow passage R1 to the common flow passage R2 via the individual flow passage RK, it is possible to circulate ink from the common flow passage R1 to the common flow passage R2 via the bypass flow passage BP more smoothly.

In the description below, as illustrated in FIG. 6, the interval between the bypass flow passage BP and the individual flow passage RK that is located next to the bypass flow passage BP in the Y-axis direction will be referred to as "interval dYB", and the interval between, among the M-number of individual flow passages, one individual flow passage RK and another individual flow passage RK that is located next to this one individual flow passage RK in the Y-axis direction will be referred to as "interval dYK". More specifically, the interval between the bypass flow passage BP1 and the individual flow passage RK[1] and the interval between the bypass flow passage BP2 and the individual flow passage RK[M] will be referred to as "interval dYB", and the interval between the individual flow passage RK[m1] and the individual flow passage RK[m2] will be referred to as "interval dYK". In this definition, the variable number m1 and the variable number m2 are natural numbers that satisfy both "1≤m1<m2≤M" and "1+m1=m2".

In addition, in the present embodiment, as illustrated in FIG. 6, the bypass flow passage BP and the individual flow passage RK are provided in such a manner that the interval dYB and the interval dYK satisfy a relation of "dYB>dYK".

For this reason, with the present embodiment, as compared with a configuration in which the interval dYB is narrower than the interval dYK, it is possible to make noise such as vibrations generated due to the flow of ink through the bypass flow passage BP less influential on ink flowing through the individual flow passage RK. Therefore, with the present embodiment, as compared with a configuration in which the interval dYB is narrower than the interval dYK, it is possible to reduce variation in ejection characteristics of ink from the M-number of nozzles N of the liquid ejecting head 1.

In the present embodiment, the individual flow passage RK[1], which is located next to the bypass flow passage BP1 in the Y-axis direction, is an example of a "first individual flow passage", and the individual flow passage RK[2], which is located next to the individual flow passage RK[1] in the Y-axis direction, is an example of a "second individual flow passage".

Moreover, in the present embodiment, as illustrated in FIG. 6, M-number of individual flow passages RK are provided between the bypass flow passage BP1 and the bypass flow passage BP2. More specifically, in the present embodiment, the bypass flow passage BP1 is located at a position that is farther outward in the Y2 direction even as viewed from the individual flow passage RK[1], which is the outermost one of the M-number of individual flow passages RK in the Y2 direction, and the bypass flow passage BP2 is located at a position that is farther outward in the Y1 direction even as viewed from the individual flow passage RK[M], which is the outermost one of the M-number of individual flow passages RK in the Y1 direction. In other words, in the present embodiment, the bypass flow passage BP1 connects the Y2-side end of the common flow passage R1 to the Y2-side end of the common flow passage R2, and the bypass flow passage BP2 connects the Y1-side end of the common flow passage R1 to the Y1-side end of the common flow passage R2. In the present embodiment, the Y2 direction is another example of the "first direction", and the individual flow passage RK[1] is an example of an "end individual flow passage".

For this reason, with the present embodiment, as compared with a configuration in which either the bypass flow passage BP1 or the bypass flow passage BP2 is, or both are, provided between two individual flow passages RK among the M-number of individual flow passages RK, it is possible to reduce the possibility that ink will stagnate at an end portion of the common flow passage R1 and an end portion of the common flow passage R2. Therefore, with the present embodiment, it is possible to reduce the possibility of occurrence of thickening of ink, staying of an air bubble present in ink, and the like at an end portion of the common flow passage R1 and an end portion of the common flow passage R2.

Moreover, in the present embodiment, as illustrated in FIG. 6, the connection opening H1 is provided between the individual flow passage RK[1] and the individual flow passage RK[M] in the Y-axis direction. That is, in the present embodiment, in the Y-axis direction, one or more individual flow passages RK among the M-number of individual flow passages RK are provided between the bypass flow passage BP1 and the connection opening H1, and one or more individual flow passages RK among the M-number of individual flow passages RK are provided between the bypass flow passage BP2 and the connection opening H1. In the present embodiment, the connection opening H1 is an example of a "supply opening", and the common flow passage BB1 is an example of a "supply flow passage".

For this reason, with the present embodiment, as compared with a configuration in which the connection opening H1 is provided outward of the individual flow passage RK[1] in the Y2 direction and a configuration in which the connection opening H1 is provided outward of the individual flow passage RK[M] in the Y1 direction, it is possible to decrease pressure that is required for supplying ink from the connection opening H1 to the M-number of individual flow passages RK and thus reduce power for driving the ink supply device 8.

Moreover, in the present embodiment, as illustrated in FIG. 6, in the Y-axis direction, the connection opening H1 is provided between the individual flow passage RK[1] and the individual flow passage RK[M], the connection opening H2 is provided between the individual flow passage RK[1] and the individual flow passage RK[M], and the M-number of individual flow passages RK are provided between the bypass flow passage BP1 and the bypass flow passage BP2. For this reason, with the present embodiment, it is possible to prevent ink from stagnating in the common flow passage R1 without any need for providing a plurality of connection openings H1 connected to the common flow passage R1, and it is possible to prevent ink from stagnating in the common flow passage R2 without any need for providing a plurality of connection openings H2 connected to the common flow passage R2. Therefore, with the present embodiment, as compared with a configuration in which a plurality of connection openings H1 connected to the common flow passage R1 is provided and a configuration in which a plurality of connection openings H2 connected to the common flow passage R2 is provided, it is possible to achieve a reduction in stagnation of ink in the common flow passage R1 and the common flow passage R2, with a simpler structure.

3. Conclusion of Embodiment

As described above, the liquid ejecting head 1 according to the present embodiment includes the head substrate 20 in which the M-number of individual flow passages RK corresponding to the M-number of pressure compartments CV configured to apply pressure to ink are formed in such a way as to be arranged in the Y1 direction; and the nozzle substrate 21 in which the M-number of nozzles N corresponding to the M-number of individual flow passages RK and configured to eject ink are formed, wherein the common flow passage BA1 that is in shared communication with the M-number of individual flow passages RK and supplies ink to the M-number of individual flow passages RK, the common flow passage BA2 that is in shared communication with the M-number of individual flow passages RK and collects ink from the M-number of individual flow passages RK, and the bypass flow passage BP1 that connects the common flow passage BA1 and the common flow passage BA2 are formed in the head substrate 20. In addition, the head substrate 20 is comprised of the pressure compartment substrate 23 in which the M-number of pressure compartments CV are formed and the communication plate 22 that is provided between the pressure compartment substrate 23 and the nozzle substrate 21.

That is, with the present embodiment, since the common flow passage BA1 and the common flow passage BA2 are connected to each other not only via the M-number of individual flow passages RK but also via the bypass flow passage BP1, it is possible to circulate ink from the common flow passage BA1 to the common flow passage BA2 stably, regardless of whether the number of nozzles N from which ink is ejected among the M-number of nozzles N is large or small.

Moreover, with the present embodiment, since the bypass flow passage BP1 is formed in the head substrate 20, as compared with a configuration in which the bypass flow passage BP1 is provided at a position different from the head substrate 20, for example, at a position away from the head substrate 20 in the Z2 direction, it is possible to make the size of the liquid ejecting head 1 in the Z2 direction smaller.

Furthermore, since the bypass flow passage BP1 is formed in the head substrate 20, as compared with a configuration in which the bypass flow passage BP1 is provided at a position different from the head substrate 20, the present embodiment makes it easier to form the bypass flow passage BP1. Specifically, with the present embodiment, since the bypass flow passage BP1 is formed in the head substrate 20 in which the M-number of pressure compartments CV are provided, it is possible to form the M-number of pressure compartments CV and the bypass flow passage BP1 in the same process.

The liquid ejecting head 1 according to the present embodiment further includes the flow passage forming substrate 26 in which the common flow passage BB1 for ink supply to the common flow passage BA1 and the connection opening H1 for ink supply to the common flow passage BB1 are provided, wherein, in the Y1 direction, one or more individual flow passages RK among the M-number of individual flow passages RK are provided between a portion where the common flow passage BA1 and the bypass flow passage BP1 are connected and the connection opening H1.

Therefore, with the present embodiment, as compared with a configuration in which the connection opening H1 is provided between the portion where the common flow passage BA1 and the bypass flow passage BP1 are connected and the M-number of individual flow passages RK and a configuration in which the portion where the common flow passage BA1 and the bypass flow passage BP1 are connected is provided between the connection opening H1 and the M-number of individual flow passages RK, it is possible to decrease pressure that is required for supplying ink from the connection opening H1 to the M-number of individual flow passages RK.

In the liquid ejecting head 1 according to the present embodiment, the flow-passage resistance of the bypass flow passage BP1 is lower than the flow-passage resistance of the individual flow passage RK.

Therefore, with the present embodiment, it is possible to circulate ink from the common flow passage BA1 to the common flow passage BA2 stably via the bypass flow passage BP1, regardless of whether the number of nozzles N from which ink is ejected among the M-number of nozzles N is large or small.

In the liquid ejecting head 1 according to the present embodiment, the bypass flow passage BP1 is located in the Y2 direction as viewed from the individual flow passage RK[1] that is located at an end in the Y2 direction among the M-number of individual flow passages RK.

Therefore, with the present embodiment, as compared with a configuration in which the bypass flow passage BP1 is provided between two individual flow passages RK among the M-number of individual flow passages RK, it is possible to reduce the possibility that ink will stagnate at an end portion of the common flow passage BA1 and an end portion of the common flow passage BA2.

In the liquid ejecting head 1 according to the present embodiment, the bypass flow passage BP2 that connects the common flow passage BA1 and the common flow passage BA2 is formed in the head substrate 20, and the M-number of individual flow passages RK are provided between the bypass flow passage BP1 and the bypass flow passage BP2.

Therefore, with the present embodiment, as compared with a configuration in which either the bypass flow passage BP1 or the bypass flow passage BP2 is, or both are, provided between two individual flow passages RK among the M-number of individual flow passages RK, it is possible to reduce the possibility that ink will stagnate at an end portion of the common flow passage R1 and an end portion of the common flow passage R2.

In the liquid ejecting head 1 according to the present embodiment, the individual flow passage RK extends in the X1 direction, the nozzle N ejects ink in the Z1 direction, and, in the Z1 direction, the Z1-side end of the bypass flow passage BP1 is located between the Z1-side end of the individual flow passage RK and the Z1-side surface of the nozzle substrate 21.

Therefore, with the present embodiment, it is possible to make the flow-passage resistance of the bypass flow passage BP1 lower than that of the individual flow passage RK and, therefore, it is possible to circulate ink from the common flow passage BA1 to the common flow passage BA2 stably via the bypass flow passage BP1.

In the liquid ejecting head 1 according to the present embodiment, the individual flow passage RK extends in the X1 direction, the bypass flow passage BP1 extends in the X1 direction, the head substrate 20 includes the pressure compartment substrate 23 in which the M-number of pressure compartments CV are provided and the communication plate 22 that is provided between the pressure compartment substrate 23 and the nozzle substrate 21, the individual-flow-passage corresponding portion PK of the pressure compartment substrate 23 that corresponds to the individual flow passage RK includes the individual portion PK1, which has a predetermined thickness Zth or greater in the area A1 in the X1 direction, an individual portion PK2, which has the predetermined thickness Zth or greater in the area A2 located in the X1 direction with respect to the area A1, and an individual portion PK3, which has a through hole provided correspondingly to the pressure compartment CV in the area A3 located between the area A1 and the area A2, and the bypass-flow-passage corresponding portion PB of the pressure compartment substrate 23 that corresponds to the bypass flow passage BP1 includes the bypass portion PB1, which has the predetermined thickness Zth or greater in the area A1, the bypass portion PB2, which has the predetermined thickness Zth or greater in the area A2, and the bypass portion PB3, which has the predetermined thickness Zth or greater in the area A3.

Therefore, with the present embodiment, it is possible to make the flow-passage resistance of the bypass flow passage BP1 lower than that of the individual flow passage RK and, therefore, it is possible to circulate ink from the common flow passage BA1 to the common flow passage BA2 stably via the bypass flow passage BP1.

Though a through hole corresponding to the pressure compartment CV is provided in the individual portion PK3, the scope of the present disclosure is not limited to this exemplary configuration. For example, the individual portion PK3 may include a portion whose thickness is less than the predetermined thickness Zth.

In the liquid ejecting head 1 according to the present embodiment, the filter F comprised of the plurality of protruding portions FT is provided in, of the common flow passage BA1, the area EK1 connected to the individual flow passages RK, and the filter F is not provided in, of the common flow passage BA1, the area EB1 connected to the bypass flow passage BP1.

Therefore, with the present embodiment, it is possible to make the flow-passage resistance against ink flowing from the common flow passage BA1 to the common flow passage BA2 via the bypass flow passage BP1 lower than the flow-passage resistance against ink flowing from the common flow passage BA1 to the common flow passage BA2 via the individual flow passage RK.

In the liquid ejecting head 1 according to the present embodiment, the individual flow passage RK extends in the X1 direction, the bypass flow passage BP1 extends in the X1 direction, and area size of a wall surface extending in a direction different from the X1 direction among wall surfaces of the bypass flow passage BP1 is smaller than area size of a wall surface extending in a direction different from the X1 direction among wall surfaces of the individual flow passage RK.

Therefore, with the present embodiment, it is possible to make the flow-passage resistance of the bypass flow passage BP1 lower than that of the individual flow passage RK and, therefore, it is possible to circulate ink from the common flow passage BA1 to the common flow passage BA2 stably via the bypass flow passage BP1.

In the liquid ejecting head 1 according to the present embodiment, the vibration absorption plate CP1 that absorbs ink vibrations is provided in the area EB1 where the bypass flow passage BP1 and the common flow passage BA1 are connected, and the vibration absorption plate CP2 that absorbs ink vibrations is provided in the area EB2 where the bypass flow passage BP1 and the common flow passage BA2 are connected.

Therefore, with the present embodiment, it is possible to prevent ejection characteristics of ink from the nozzle N corresponding to the individual flow passage RK from varying due to ink vibrations generated in the bypass flow passage BP1.

In the liquid ejecting head 1 according to the present embodiment, the vibration absorption plate CP1 and the vibration absorption plate CP2 are provided at a distance from each other.

Therefore, with the present embodiment, as compared with a configuration in which the vibration absorption plate CP1 and the vibration absorption plate CP2 are formed integrally, it is possible to make the volume of the diaphragm 24 including the vibration absorption plate CP1 and the vibration absorption plate CP2 smaller.

In the liquid ejecting head 1 according to the present embodiment, the vibration absorption plate CP1 that absorbs ink vibrations is provided in the area EK1 where the individual flow passages RK and the common flow passage BA1 are connected, and the vibration absorption plate CP1 provided in the area EB1 and the vibration absorption plate CP1 provided in the area EK1 are formed integrally.

Therefore, as compared with a configuration in which the vibration absorption plate CP1 is provided separately in the area EB1 and the area EK1, the present embodiment makes it easier to form the vibration absorption plate CP1.

In the liquid ejecting head 1 according to the present embodiment, the M-number of individual flow passages RK include the individual flow passage RK[1] that is located next to the bypass flow passage BP1 in the Y1 direction and the individual flow passage RK[2] that is located next to the individual flow passage RK[1] in the Y1 direction, and the interval dYB between the bypass flow passage BP1 and the individual flow passage RK[1] is wider than the interval dYK between the individual flow passage RK[1] and the individual flow passage RK[2].

Therefore, with the present embodiment, as compared with a configuration in which the interval dYB is narrower than the interval dYK, it is possible to make noise such as vibrations generated due to the flow of ink through the bypass flow passage BP1 less influential on ink flowing through the individual flow passage RK.

B. Modification Examples

The embodiment described as examples above can be modified in various ways. Some specific examples of modification are described below. Two or more modification examples selected arbitrarily from the description below may be combined as long as they are not contradictory to each other or one another.

First Modification Example

In the embodiment described above, a case where the width of the bypass flow passage BP in the Z-axis direction is greater than that of the individual flow passage RK has been taken as an example. However, the scope of the present disclosure is not limited to this exemplary configuration. For example, the width of the individual flow passage RK in the Z-axis direction may be substantially the same as the width of the bypass flow passage BP in the Z-axis direction. The concept of "substantially the same" mentioned here includes not only a case of being perfectly the same but also a case of being able to be deemed as the same, with a margin of error taken into consideration. In this specification, the concept of "substantially the same" includes a case of being able to be deemed as the same, with a margin of error of 10% or so taken into consideration.

Figure 7:
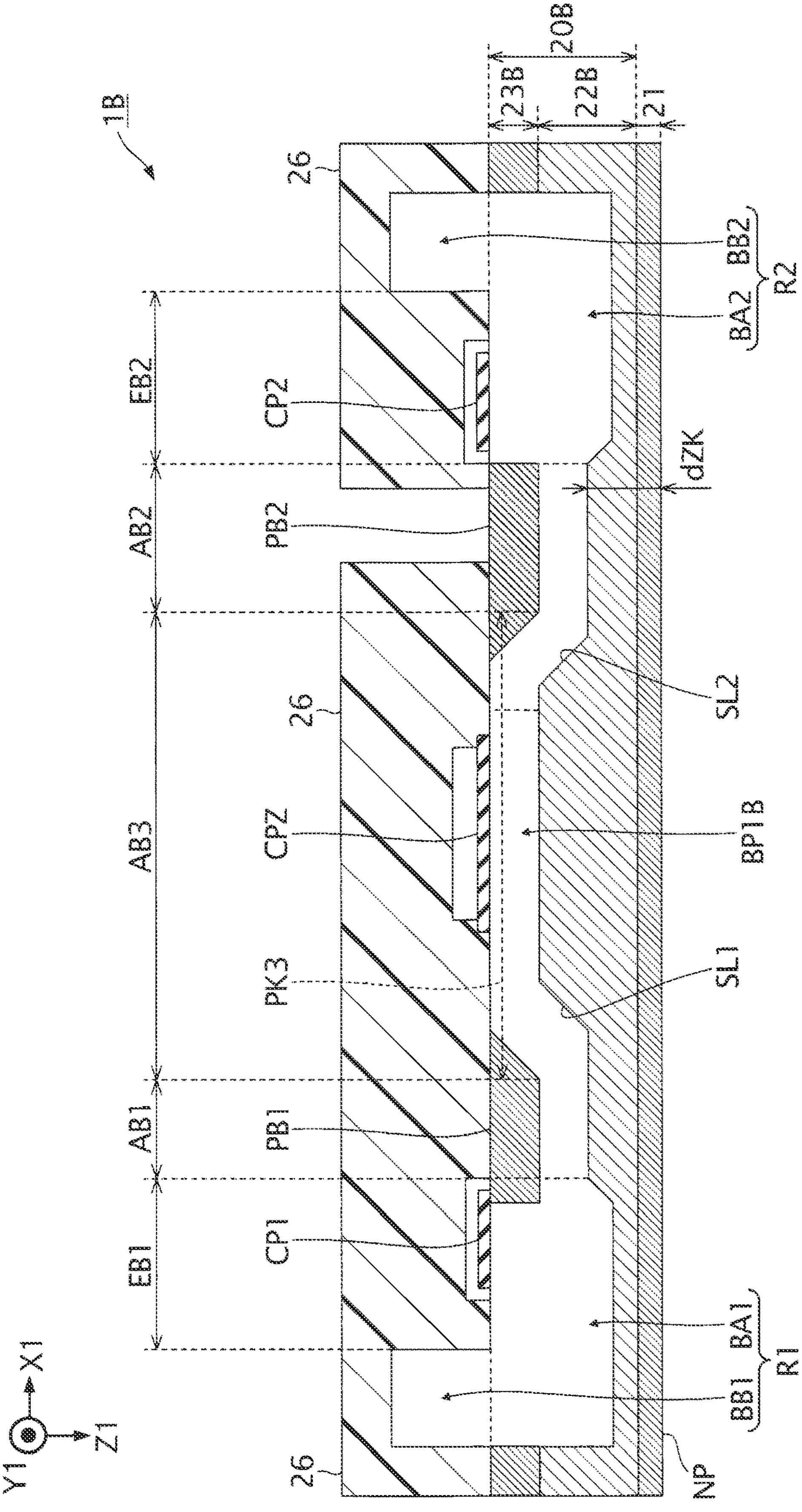
FIG. 7 is a cross-sectional view illustrating an example of the configuration of a liquid ejecting head according to a first modification example.

FIG. 7 is a cross-sectional view of a liquid ejecting head 1B according to this modification example.

As illustrated in FIG. 7, the liquid ejecting head 1B is different from the liquid ejecting head 1 according to the foregoing embodiment in that it includes a head substrate 20B in place of the head substrate 20. The head substrate 20B is different from the counterpart in the liquid ejecting head 1 according to the foregoing embodiment in that it includes a communication plate 22B in place of the communication plate 22 and includes a pressure compartment substrate 23B in place of the pressure compartment substrate 23. The communication plate 22B and the pressure compartment substrate 23B are different from the communication plate 22 and the pressure compartment substrate 23 according to the foregoing embodiment in that a bypass flow passage BP1B is formed in them in place of the bypass flow passage BP1 and in that a bypass flow passage BP2B is formed in them in place of the bypass flow passage BP2. In the description below, the bypass flow passage BP1B and the bypass flow passage BP2B will be collectively referred to as "bypass flow passage BP-B". The bypass flow passage BP-B is different from the bypass flow passage BP according to the foregoing embodiment in that it has a shape including the sloped surface SL1 and the sloped surface SL2 in place of a flat Z1-side wall surface, in that the minimum distance in the Z-axis direction between the Z1-side end of the bypass flow passage BP-B and the nozzle plane NP is set to be the distance dZK in place of the distance dZB, and, in addition, in that the portion, of its Z2-side wall surface, located at the area AB3 is the individual portion PK3 in place of the bypass portion PB3. That is, the liquid ejecting head 1B according to this modification example is different from the liquid ejecting head 1 according to the foregoing embodiment in that the bypass flow passage BP-B that has substantially the same shape as the individual flow passage RK according to the foregoing embodiment in a cross-sectional view taken in the Y1 direction is provided in place of the bypass flow passage BP.

According to this modification example, the liquid ejecting head 1B includes the M-number of individual flow passages RK, and the bypass flow passage BP1B and the bypass flow passage BP2B that have substantially the same shape in cross section as the individual flow passage RK; therefore, as compared with a configuration in which the bypass flow passage BP1B and the bypass flow passage BP2B have a cross-sectional shape different from that of the individual flow passage RK, the manufacturing of the liquid ejecting head 1B is easier.

Second Modification Example

In the embodiment and the first modification example described above, the vibration absorption plate CP1 and the vibration absorption plate CP2 are provided at a distance from each other. However, the scope of the present disclosure is not limited to this exemplary configuration. The vibration absorption plate CP1 and the vibration absorption plate CP2 may be formed integrally.

Figure 8:
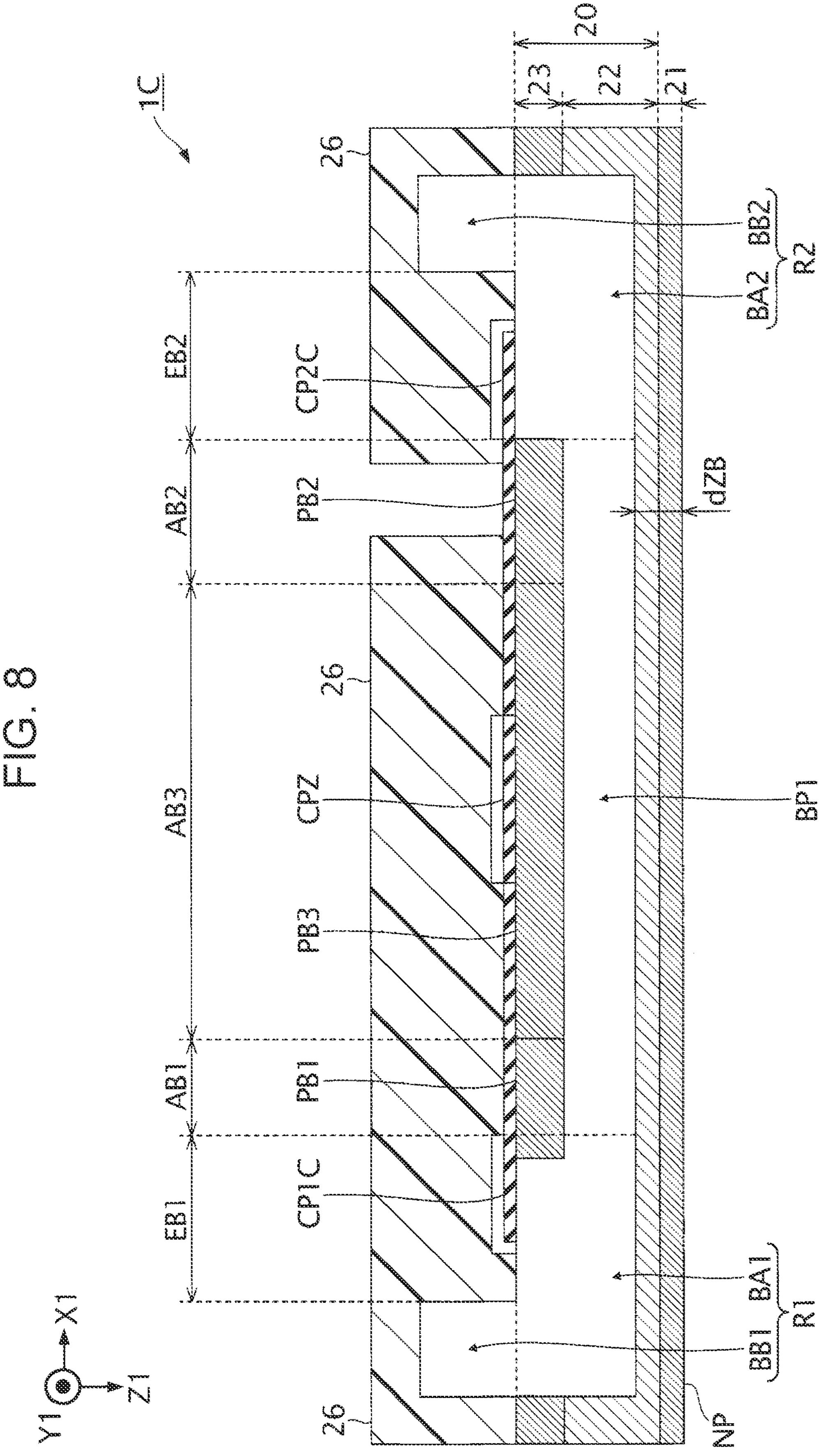
FIG. 8 is a cross-sectional view illustrating an example of the configuration of a liquid ejecting head according to a second modification example.

FIG. 8 is a cross-sectional view of a liquid ejecting head 1C according to this modification example.

As illustrated in FIG. 8, the liquid ejecting head 1C is different from the liquid ejecting head 1 according to the foregoing embodiment in that it includes a vibration absorption plate CP1C in place of the vibration absorption plate CP1 and includes a vibration absorption plate CP2C in place of the vibration absorption plate CP2. The vibration absorption plate CP1C is different from the vibration absorption plate CP1 according to the foregoing embodiment in that it is formed integrally with the vibration plate CPZ. The vibration absorption plate CP2C is different from the vibration absorption plate CP2 according to the foregoing embodiment in that it is formed integrally with the vibration plate CPZ.

As described above, in the liquid ejecting head 1C according to this modification example, the vibration absorption plate CP1C and the vibration absorption plate CP2C are formed integrally.

Therefore, as compared with a configuration in which the vibration absorption plate CP1C and the vibration absorption plate CP2C are formed separately, this modification example makes it easier to form the vibration absorption plate CP1C and the vibration absorption plate CP2C.

In this modification example, the diaphragm 24 that includes the vibration plate CPZ that changes pressure inside the pressure compartment CV by being driven to vibrate by the piezoelectric element PZ provided at the position corresponding to the pressure compartment CV may be provided, and the vibration absorption plate CP1C may be formed of the diaphragm 24.

Therefore, as compared with a configuration in which the vibration absorption plate CP1C and the vibration plate CPZ are formed separately, this modification example makes it easier to form the vibration absorption plate CP1C.

Third Modification Example

In the embodiment and the first and second modification examples described above, the liquid ejecting head 1 that includes the common flow passage R1 that supplies ink to the individual flow passages RK and includes the common flow passage R2 that collects ink from the individual flow passages RK has been taken as an example. However, the scope of the present disclosure is not limited to this exemplary configuration. The liquid ejecting head 1 may be configured to include the common flow passage R1 that supplies ink to the individual flow passages RK but not to include the common flow passage R2 that collects ink from the individual flow passages RK.

Figure 9:
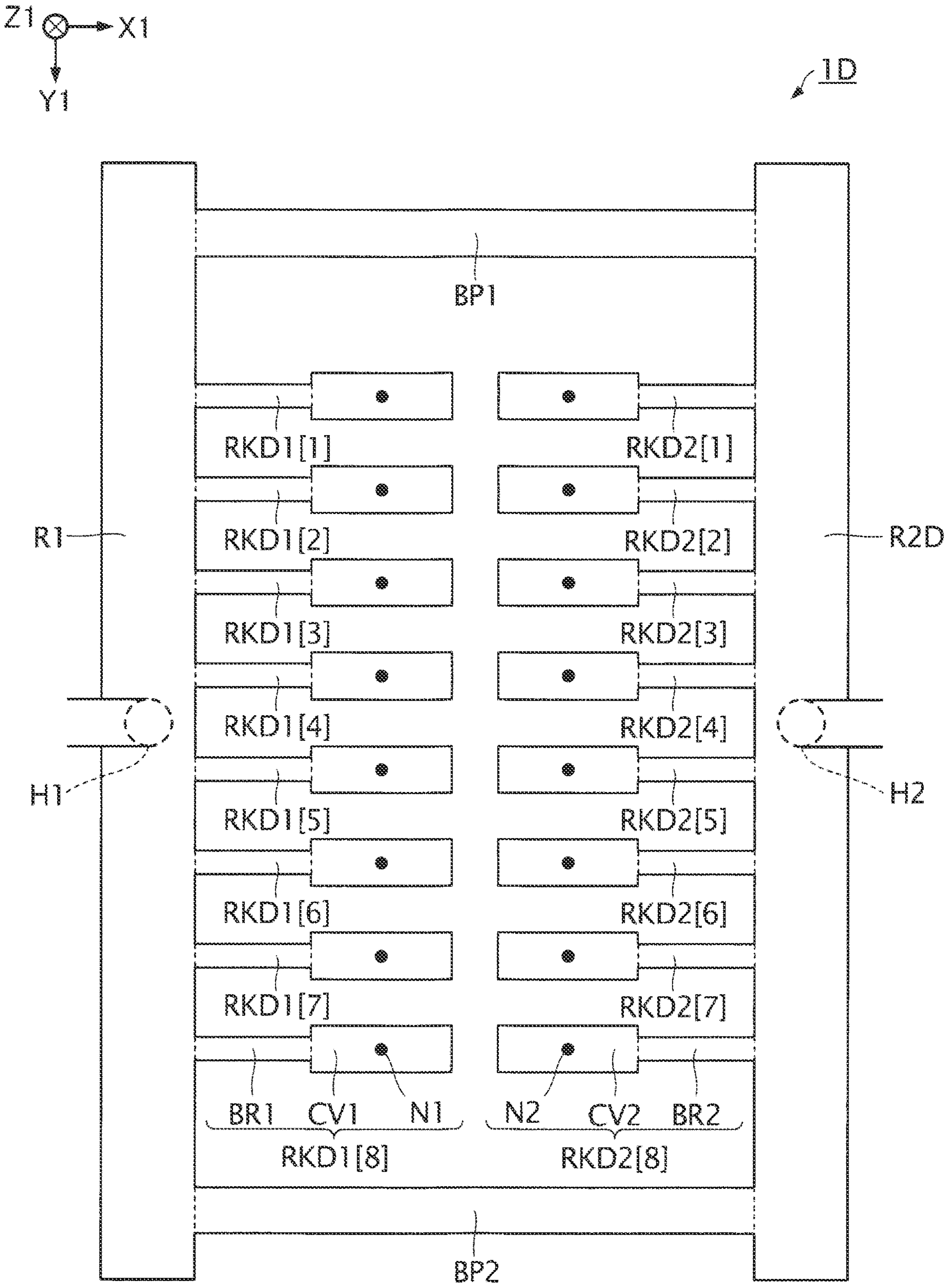
FIG. 9 is a plan view illustrating an example of the configuration of a liquid ejecting head according to a third modification example.

FIG. 9 is a plan view of a liquid ejecting head 1D according to this modification example.

As illustrated in FIG. 9, the liquid ejecting head 1D is different from the liquid ejecting head 1 according to the foregoing embodiment in that it includes a common flow passage R2D in place of the common flow passage R2 and includes M-number of individual flow passages RKD1 and M-number of individual flow passages RKD2 in place of the M-number of individual flow passages RK. Each individual flow passage RKD1 includes a pressure compartment CV1 that applies pressure to ink so as to perform ink ejection from a nozzle N1 and includes the connection flow passage BR1 that connects the common flow passage R1 and the pressure compartment CV1 and receives ink supply from the common flow passage R1. Each individual flow passage RKD2 includes a pressure compartment CV2 that applies pressure to ink so as to perform ink ejection from a nozzle N2 and includes the connection flow passage BR2 that connects the common flow passage R2 and the pressure compartment CV2 and receives ink supply from the common flow passage R2. The common flow passage R2D supplies, to the M-number of individual flow passages RKD2, ink supplied from the connection opening H2. In addition, in this modification example, the bypass flow passage BP1 connects the common flow passage R1 and the common flow passage R2D, and the bypass flow passage BP2 connects the common flow passage R1 and the common flow passage R2D.

Fourth Modification Example

In the embodiment and the first to third modification examples described above, a serial-type liquid ejecting apparatus 100 that reciprocates, in the X-axis direction, the housing case 921 in which liquid ejecting heads are mounted has been taken as an example. However, the scope of the present disclosure is not limited to this exemplary configuration. The liquid ejecting apparatus 100 may be a so-called line-type liquid ejecting apparatus in which the plural nozzles N are arranged throughout the entire width of the medium PP.

Fifth Modification Example

The liquid ejecting apparatus according to the embodiment and the first to fourth modification examples described above can be applied to various kinds of equipment such as facsimiles and copiers, etc. in addition to print-only machines. The scope of application and use of the liquid ejecting apparatus according to the present disclosure is not limited to printing. For example, a liquid ejecting apparatus that ejects a colorant solution can be used as an apparatus for manufacturing a color filter of a liquid crystal display device. A liquid ejecting apparatus that ejects a solution of a conductive material can be used as a manufacturing apparatus for forming wiring lines and electrodes of a wiring substrate.

What is claimed is:

1. A liquid ejecting head, comprising:

a first substrate in which a plurality of individual flow passages corresponding to a plurality of pressure compartments configured to apply pressure to a liquid is formed in such a way as to be arranged in a first direction; and a second substrate in which a plurality of nozzles corresponding to the plurality of individual flow passages and configured to eject a liquid is formed, wherein a first common flow passage that is in shared communication with the plurality of individual flow passages and supplies a liquid to the plurality of individual flow passages, a second common flow passage that is in shared communication with the plurality of individual flow passages and collects a liquid from the plurality of individual flow passages, and a first bypass flow passage that connects the first common flow passage and the second common flow passage are formed in the first substrate, the first substrate is comprised of a pressure compartment substrate in which the plurality of pressure compartments is formed and a communication plate that is provided between the pressure compartment substrate and the second substrate, a first vibration absorber that absorbs liquid vibrations is provided in an area where the first bypass flow passage and the first common flow passage are connected, and a second vibration absorber that absorbs liquid vibrations is provided in an area where the first bypass flow passage and the second common flow passage are connected.

2. The liquid ejecting head according to claim 1, further comprising:

a third substrate in which a supply flow passage for liquid supply to the first common flow passage and a supply opening for liquid supply to the supply flow passage are provided, wherein in the first direction, one or more individual flow passages among the plurality of individual flow passages are provided between a portion where the first common flow passage and the first bypass flow passage are connected and the supply opening.

3. The liquid ejecting head according to claim 1, wherein a flow-passage resistance of the first bypass flow passage is lower than a flow-passage resistance of the individual flow passage.

4. The liquid ejecting head according to claim 1, wherein the first bypass flow passage is located in the first direction as viewed from an end individual flow passage that is located at an end in the first direction among the plurality of individual flow passages.

5. The liquid ejecting head according to claim 4, wherein a second bypass flow passage that connects the first common flow passage and the second common flow passage is formed in the first substrate, and the plurality of individual flow passages is provided between the first bypass flow passage and the second bypass flow passage.

6. The liquid ejecting head according to claim 1, wherein the individual flow passage extends in a second direction intersecting with the first direction, the nozzle ejects the liquid in a third direction intersecting with the first direction and with the second direction, and in the third direction, an end in the third direction of the first bypass flow passage is located between an end in the third direction of the individual flow passage and an end in the third direction of the second substrate.

7. The liquid ejecting head according to claim 1, wherein the individual flow passage extends in a second direction intersecting with the first direction, the first bypass flow passage extends in the second direction, a first flow passage portion, of the pressure compartment substrate, corresponding to the individual flow passage includes a first portion that has a predetermined thickness or greater in a first area in the second direction, a second portion that has the predetermined thickness or greater in a second area located in the second direction as viewed from the first area, and a third portion that has a through hole provided correspondingly to the pressure compartment in a third area located between the first area and the second area, and a second flow passage portion, of the pressure compartment substrate, corresponding to the first bypass flow passage includes a fourth portion that has the predetermined thickness or greater in the first area, a fifth portion that has the predetermined thickness or greater in the second area, and a sixth portion that has the predetermined thickness or greater in the third area.

8. The liquid ejecting head according to claim 1, wherein a filter comprised of a plurality of protruding portions is provided in, of the first common flow passage, a first connection portion connected to the individual flow passages, and the filter is not provided in, of the first common flow passage, a second connection portion connected to the first bypass flow passage.

9. The liquid ejecting head according to claim 1, wherein the individual flow passage extends in a second direction intersecting with the first direction, the first bypass flow passage extends in the second direction, and area size of a portion extending in a direction other than the second direction, among wall surfaces of the first bypass flow passage, is smaller than area size of a portion extending in a direction other than the second direction, among wall surfaces of the individual flow passage.

10. The liquid ejecting head according to claim 1, wherein the first vibration absorber and the second vibration absorber are provided at a distance from each other.

11. The liquid ejecting head according to claim 1, wherein the first vibration absorber and the second vibration absorber are formed integrally.

12. The liquid ejecting head according to claim 1, wherein a third vibration absorber that absorbs liquid vibrations is provided in an area where the individual flow passages and the first common flow passage are connected, and the first vibration absorber and the third vibration absorber are formed integrally.

13. The liquid ejecting head according to claim 1, further comprising:

a diaphragm that changes pressure inside the pressure compartment by being driven to vibrate by a piezoelectric element provided at a position corresponding to the pressure compartment, wherein the first vibration absorber is formed of the diaphragm.

14. The liquid ejecting head according to claim 1, wherein the plurality of individual flow passages includes a first individual flow passage located next to the first bypass flow passage in the first direction and a second individual flow passage located next to the first individual flow passage in the first direction, and an interval between the first bypass flow passage and the first individual flow passage is wider than an interval between the first individual flow passage and the second individual flow passage.

15. A liquid ejecting apparatus, comprising:

the liquid ejecting head according to claim 1; and a controller that controls liquid ejection from the liquid ejecting head.

* * * * *